United States Patent [19]

Edwards

[11] 4,394,700
[45] Jul. 19, 1983

[54] RESTRAINING AND SEALING MECHANISM FOR DISC CARTRIDGE

[75] Inventor: Roy J. Edwards, San Jose, Calif.

[73] Assignee: Disctron, Inc., Milpitas, Calif.

[21] Appl. No.: 249,899

[22] Filed: Apr. 1, 1981

[51] Int. Cl.³ ............................................. G11B 23/04
[52] U.S. Cl. ..................................... 360/133; 206/444
[58] Field of Search ......................... 360/133, 97–99, 360/86, 60; 206/444

[56] References Cited

U.S. PATENT DOCUMENTS

| | | | |
|---|---|---|---|
| 3,526,884 | 9/1970 | Buslik et al. | 360/133 |
| 3,635,608 | 1/1972 | Crouch et al. | 206/444 |
| 3,715,739 | 2/1973 | Van Acker | 360/97 |
| 4,078,246 | 3/1978 | Berthoux et al. | 360/133 |
| 4,084,200 | 4/1978 | Adair et al. | 360/60 X |
| 4,106,066 | 8/1978 | Kudo | 360/133 |
| 4,184,184 | 1/1980 | Hedin et al. | 360/133 |

FOREIGN PATENT DOCUMENTS 52-76009  6/1977  Japan ................................. 360/133

*Primary Examiner*—John H. Wolff

*Attorney, Agent, or Firm*—Spensley, Horn, Jubas & Lubitz

[57] ABSTRACT

A mechanism for restraining a magnetic disc within a cartridge and for sealing the cartridge when the cartridge is not in use is described. The present invention has one or more spring-loaded members located on the bottom of the cartridge which are coupled to the cartridge but movable with respect to it and which are separate from the rotatable hub assembly to which the magnetic disc is clamped within the cartridge. The spring-loaded member or members press in an axial direction against a surface on the hub to force together the overlapping sealing surfaces on the hub and the cartridge, thus sealing the cartridge and preventing the hub assembly and magnetic disc from rotating when the cartridge is not in use. When the cartridge is inserted into a disc-drive assembly, release pins overcome the spring-loading of the member or members and allow the sealing surface on the hub assembly and cartridge to separate. The hub assembly and disc may thus be rotated as they are no longer in contact with any part of the cartridge. Also clean air is permitted to circulate from the disc-drive assembly into the cartridge through the opening created by the separation of the sealing surfaces.

17 Claims, 18 Drawing Figures

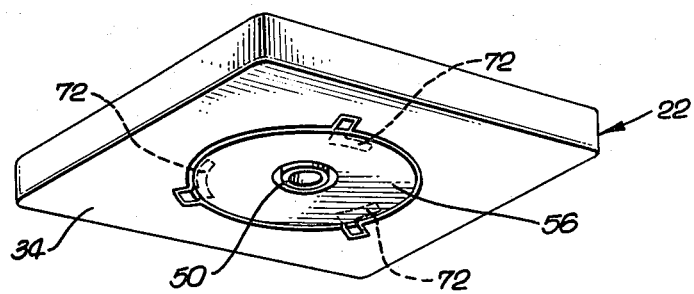
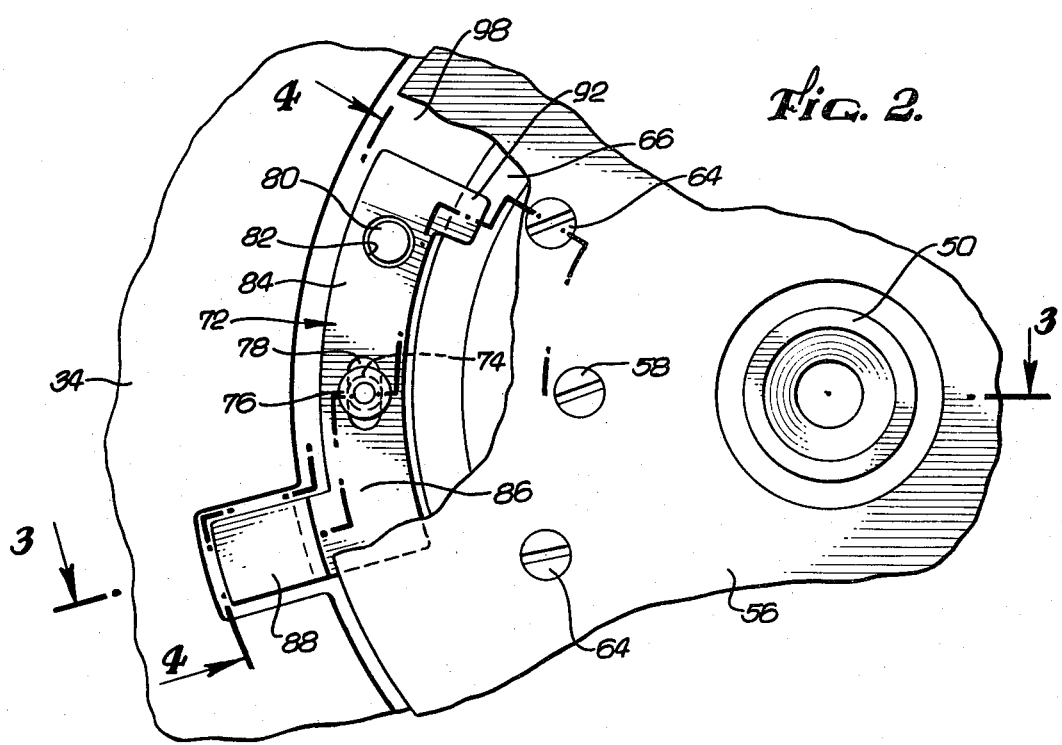
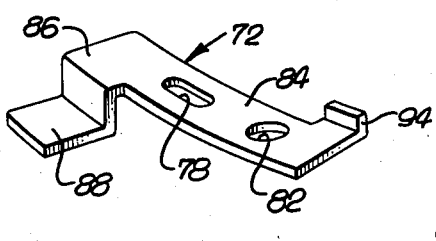
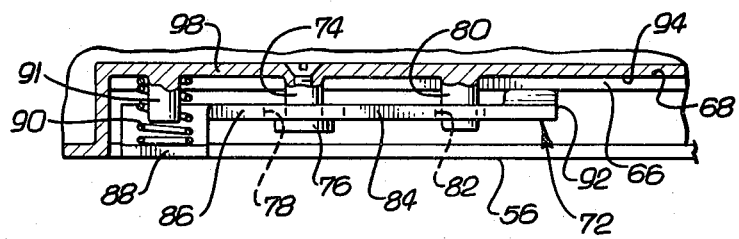
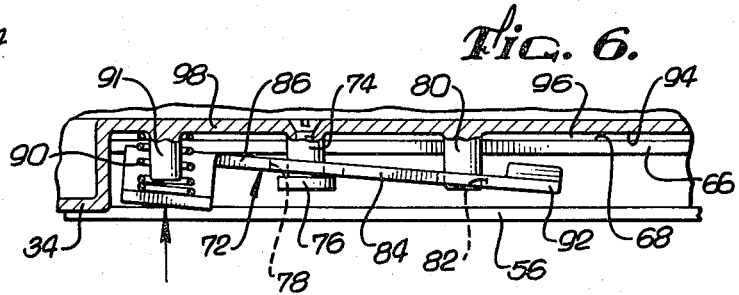

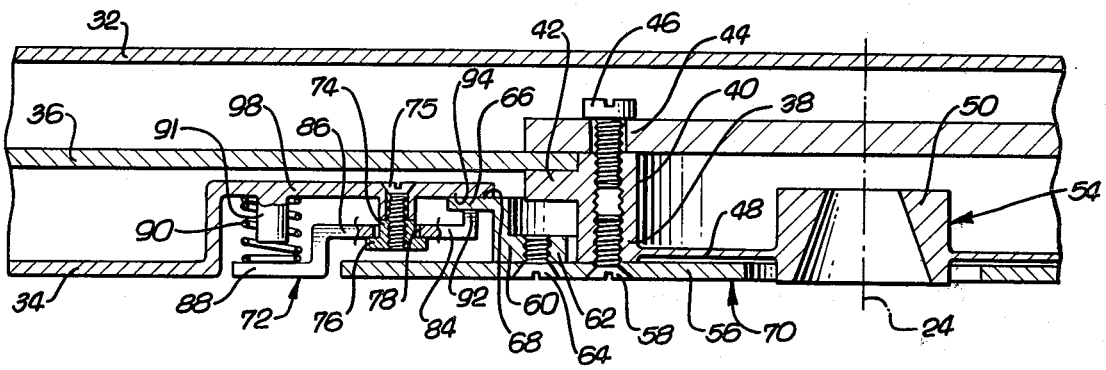
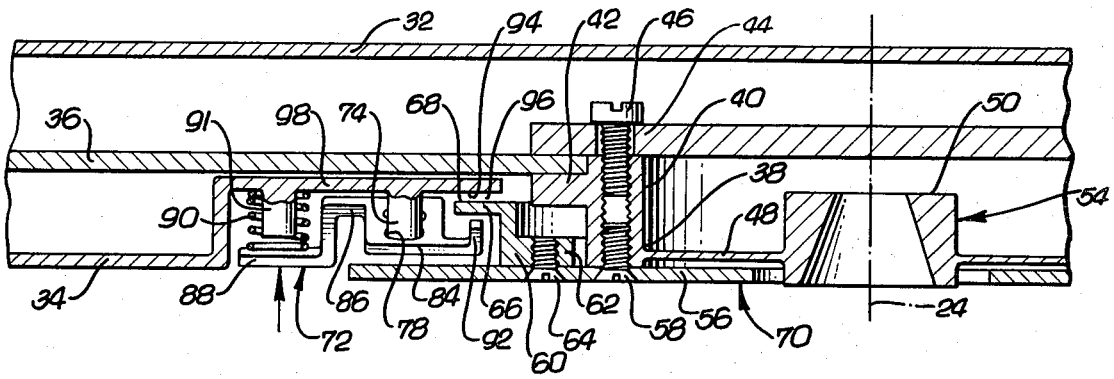
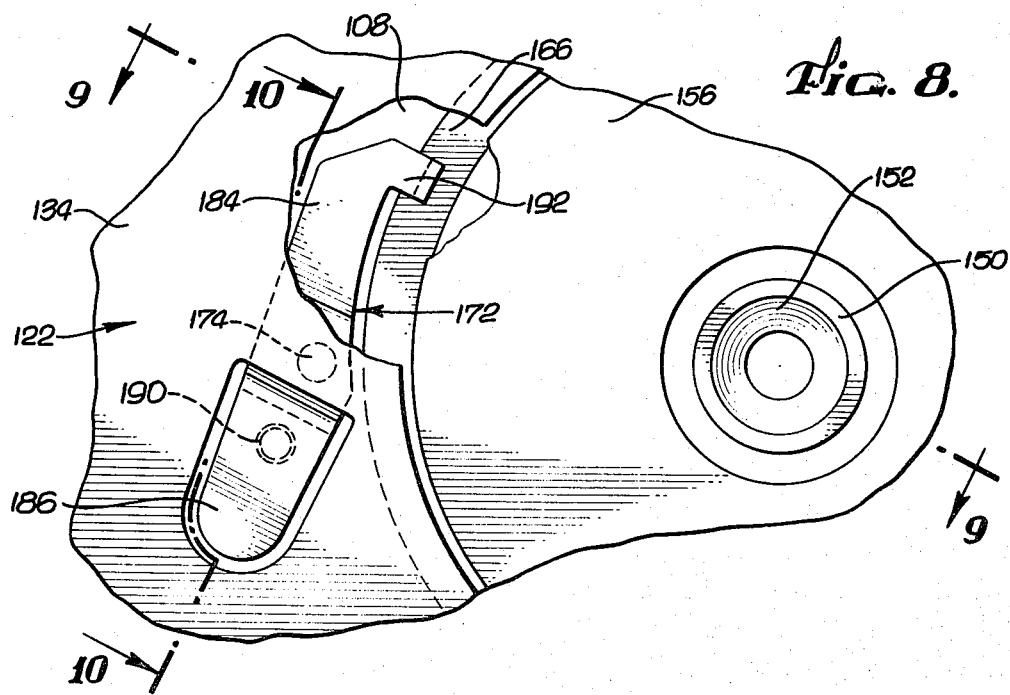

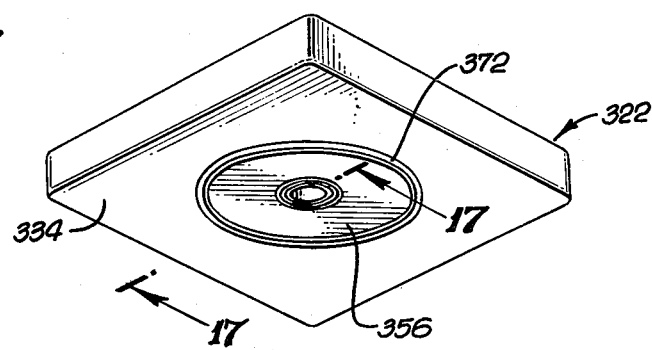
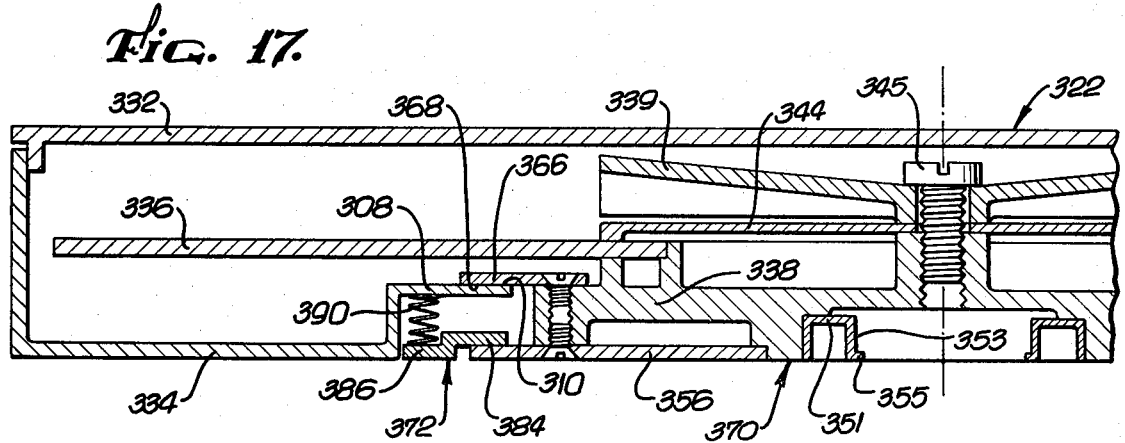
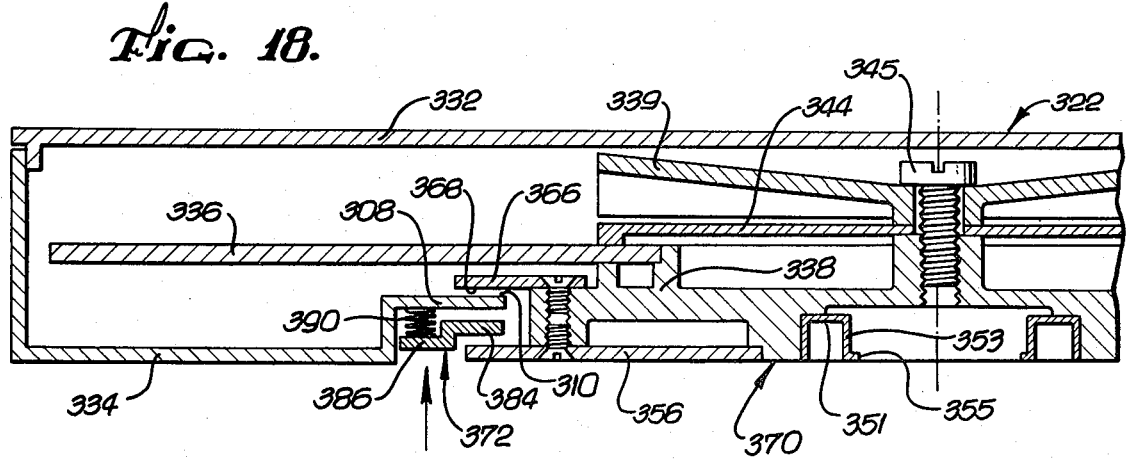

RESTRAINING AND SEALING MECHANISM FOR DISC CARTRIDGE

BACKGROUND OF THE INVENTION

A. Field of the Invention

The present invention relates to the field of mechanisms for restraining a rotatable magnetic disc and a hub assembly within a cartridge and for sealing the cartridge, when the cartridge is not in use.

B. Background of the Invention

When not in use, a cartridge for a magnetic disc should be sealed in order to prevent the ingress of contaminants into the cartridge and to restrain the magnetic disc and the hub assembly to which the disc is clamped from freely moving around within the cartridge during handling. Such movement could possibly result in the disc striking an interior surface of the cartridge, thereby causing damage to the disc. When the cartridge is inserted into a disc-drive assembly, however, the hub and disc must be allowed to rotate while the cartridge remains stationary. It is also desirable that clean air, but not the possibly contaminated air of the external environment, be allowed to circulate between the disc-drive assembly and the cartridge.

The prior art devices have included apparatuses having a handle or door disposed near the top of the cartridge in order to press the hub and disc assembly downward to seal the cartridge and to restrain the movement of the disc when the cartridge is not in use. This, or a similar approach has been taken in U.S. Pat. Nos. 3,715,739 issued to Van Acker, 3,635,608 issued to Crouch et al., 3,526,884 issued to Buslik et al., 4,071,862, issued to Lathrop, Jr. et al., 4,084,200 issued to Adair et al., 4,106,066 issued to Kudo, and 4,184,184 issued to Hedin et al.

In U.S. Pat. No. 4,078,246 issued to Berthoux et al., a different approach has been taken. In that patent, the top and bottom of the disc container are formed by rigid but elastically deformable material. When not in use, the top and bottom of the disc container tend to push outward on flanges disposed on the hub assembly, thereby mechanically holding the disc and hub stationary and sealing the disc container. In order to use the container in a disc-drive assembly, the top and bottom sides of the disc containers are pushed inward in order to allow the hub and disc to rotate freely. This arrangement requires close tolerances in the disc-drive assembly in order to insure that the correct amount of pressure is applied at both the top and the bottom of the disc container. Since such a disc container or cartridge is typically made of plastic, plastic is essentially being used as a spring. Aside from the close tolerances required, a disadvantage to the use of plastic as a spring is that plastic is susceptible to breaking. Furthermore, stress relaxation in the plastic due to creep causes the spring force to tend to decrease with time.

SUMMARY OF THE INVENTION

The present invention has for an object to provide a low cost and simple mechanism for restraining a disc within a cartridge and for sealing the cartridge when the cartridge is not in use. Another object of the present invention is to provide in such a mechanism the capability of being operated entirely automatically from the bottom of the cartridge when the cartridge is inserted into a disc-drive assembly. A third object is to provide these capabilities in a mechanism which does not rely on the flexing of any of the walls of the cartridge for its operation.

To achieve the above objects, the present invention uses one or more spring-loaded members that are physically distinct from the cartridge and the hub to press in an axial direction against the hub and to thereby force an annular sealing surface on the hub against an opposing sealing surface on the cartridge. The force with which these sealing surfaces are held together prevents the hub and the disc from rotating or otherwise moving within the cartridge while the cartridge is not in use. However, release pins or stops located within the disc-drive assembly provide a force counteracting the spring-loading of the member or members when the cartridge is loaded into the disc-drive assembly, so that the member or members no longer bear against the hub. The hub is then free to engage the spindle in the disc-drive assembly for rotating the hub and disc, and clean air may circulate from the disc-drive through the cartridge ensuring that the magnetic surfaces of the disc are maintained in a clean condition.

In one embodiment, vertically pivoting levers are mounted on a bottom surface of a flange which is a part of the cartridge. The hub has a radially outwardly extending annular flange having a surface which overlaps an annular surface located on the bottom of a flange of the cartridge. A pressing arm on each lever may be forced upward to axially displace the flange on the hub and to cause the upper surface of this flange to seal against the surface on the cartridge flange. This pressing arm is displaced upwards by means of a coil spring mounted between the cartridge and the other or control arm of the lever, which is located on the opposite side of the pivoting point of the lever and pressed downward by the coil spring. When the cartridge is not in use, the force with which the annular flange on the hub is held against the surface of the cartridge flange prevents the hub and disc from rotating and also seals the cartridge against the ingress of contaminants. In this embodiment, at least three levers, disposed preferably on a circular pattern, would be employed to press upon the annular flange on the hub.

To overcome the spring-loading on the control arms of the levers due to the coil springs, release pins are positioned within the disc-drive assembly. When the cartridge is inserted into the disc-drive assembly, the release pins press upwards against the control arms of the levers. The upward force of the release pins overcomes the downward force of the coil springs so that the levers rotate and no longer push against the annular flange of the hub. This unseals the cartridge and frees the hub and disc for rotation.

In a second embodiment, the radially outwardly extending annular flange on the hub which seals against a surface on a cartridge flange extends, in a radial direction, beyond the portion of the hub used to couple the rotation of the disc-drive assembly to the hub. This permits a stationary surface of the cartridge, rather than a rotating surface of the hub, to be disposed directly beneath the pressing arm of the lever. Unlike the first embodiment, a pressing arm of a lever in the second embodiment may thus be pushed all the way down to the surface beneath it, since that surface does not rotate.

In addition, the levers, when viewed from the side, are configured to have three steps. This structure permits the control arms of the levers to move almost in entire distance separating the cartridge flange to which the levers are mounted from the bottom of the cartridge so that the tolerances with respect to release pin travel into the cartridge and the placement of components are less critical.

A third embodiment of the present invention uses a lever similar to that described above with respect to the second embodiment but having two pressing arms for axially displacing two radially separated points on the hub. This lever requires only one control arm and thus reduces the number of release pins needed in a disc-drive assembly in order to unseal the cartridge and to free the hub and disc for rotation, since with only two such levers, an axial force can be applied at four points on an annular flange on the hub. In the single lever configuration described with respect to the first and second embodiments, normally at least three such levers, and consequently three pins to overcome the spring-loading of the levers, would be required for good sealing.

A fourth embodiment uses an annular ring which is neither part of the hub nor part of the cartridge in order to axially displace the hub and to cause an annular sealing surface on the hub to seal against a surface on a flange which is part of the cartridge. The annular ring is situated generally parallel to the top and bottom of the cartridge. The radially inward portion of the ring overlaps, on its lower side, a flange on the hub while the radially outward portion overlaps, on its upper side, a surface of the cartridge flange. Between the surface of the cartridge flange and the radially outward portion of the annular ring, coil springs are disposed in order to push the annular ring downward. This downward force is transmitted by the radially inward portion of the annular ring to the flange on the hub. This causes the annular sealing surface on the hub to seal against the surface of the cartridge flange, thus restraining the hub and disc from moving and sealing the cartridge.

When the cartridge is inserted into a disc-drive assembly, release pins push against the radially outward portion of the annular ring in opposition to the springs, thereby pushing the annular ring upward and away from the flange on the hub. This allows the hub and disc to be axially displaced relative to the cartridge and thus to be rotated.

It will be particularly noticed with respect to the present invention, and in particular with respect to the four embodiments to be described herein, that the sealing and restraining function of the mechanism can be overcome by forces applied only at the bottom of the cartridge. It is not necessary, as with previous cartridges to activate a handle or door at the top of the cartridge or to apply an elastically deforming force to the top of the cartridge. In the present invention the cartridge itself may be designed independent of any need for flexing of its top or bottom surfaces, as the sealing and unsealing operations are accomplished by the movement of an independent member or members.

DESCRIPTION OF THE DRAWINGS

FIG. 1 is a view, from beneath, of a cartridge using the first described embodiment of the present invention.

FIG. 2 is a partial cut-away view, from beneath, of the cartridge using the first described embodiment of the present invention shown in FIG. 1.

FIG. 3 is a sectional view taken along the lines 3—3 of FIG. 2, in which the mechanism of the first embodiment is shown when the cartridge is not inserted into a disc-drive assembly, the mechanism sealing the cartridge and restraining the hub and disc.

FIG. 4 is a sectional view taken along the lines 4—4 of FIG. 2, in which the mechanism of the first embodiment is shown when the cartridge is not inserted into a disc-drive assembly, the mechanism sealing the cartridge and restraining the hub and disc.

FIG. 5 is a perspective view of the lever used in the first described embodiment of the present invention.

FIG. 6 is a view similar to that shown in FIG. 4, in which the mechanism of the first embodiment is shown after the cartridge has been inserted into a disc-drive assembly, the mechanism unsealing the cartridge and permitting the hub and disc to be rotated.

FIG. 7 is a view similar to that shown in FIG. 3, in which the mechanism of the first embodiment is shown after the cartridge has been inserted into a disc-drive assembly, the mechanism unsealing the cartridge and permitting the hub and disc to be rotated.

FIG. 8 is a partial cut-away view, from beneath, of a cartridge using the second described embodiment of the present invention.

FIG. 16 is a view, from beneath, of a cartridge using the fourth described embodiment of the present invention.

FIG. 17 is a partial sectional view of a cartridge using the fourth described embodiment of the present invention, taken along the lines 17—17 in FIG. 16, in which the mechanism of the fourth described embodiment is shown when the cartridge is not inserted into a disc-drive assembly, the mechanism sealing the cartridge and restraining the hub and disc.

FIG. 18 is a view similar to that shown in FIG. 17, in which the mechanism of the fourth described embodiment is shown after the cartridge has been inserted into a disc-drive assembly, the mechanism unsealing the cartridge and permitting the hub and disc to be rotated.

DESCRIPTION OF THE INVENTION

Figure 9:
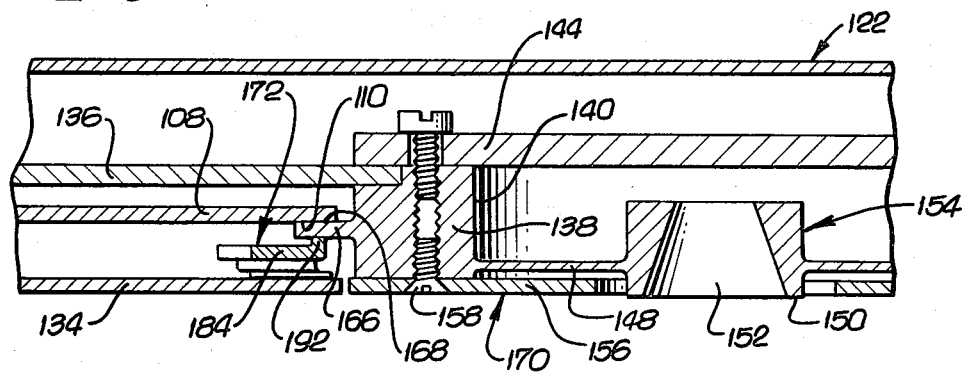
FIG. 9 is a sectional view taken along the lines 9—9 of FIG. 8, in which the mechanism of the second embodiment is shown when the cartridge is not inserted into a disc-drive assembly, the mechanism sealing the cartridge and restraining the hub and disc.

The present invention is for a sealing and restraining mechanism for disc cartridges. When the cartridge is not employed within a disc-drive assembly, the mechanism seals the cartridge against dust and dirt from the environment and restrains the magnetic disc and the hub assembly to which it is clamped from rotating or otherwise moving within the cartridge. Such motion is not desirable because of the possible damage that could result from the magnetic disc striking the sides of the cartridge.

In the present invention, the mechanism is located on the bottom of the cartridge containing the magnetic disc and the sealing and restraining functions are accomplished by the pressing together of an annular sealing surface on the hub assembly and an annular sealing surface located on the cartridge. These surfaces are generally parallel to the disc and to the top and bottom of the cartridge. The pressing together of these surfaces is accomplished by a member or members which move independently of the cartridge and the hub assembly and apply a force in a axial direction against a flange on the hub assembly. The member or members have a control portion situated beneath a surface of the cartridge. Between this portion and the cartridge, pressing means, such as springs, are placed to force that portion of the member away from the cartridge and cause another portion of the member to press against the flange on the hub assembly. The resultant axial displacement of the hub assembly causes the sealing surfaces on the hub and the cartridge to make contact and to thereby seal the cartridge and restrain the disc and hub assembly. This is the normal condition of a cartridge when the cartridge is not inserted into a disc-drive assembly.

When the cartridge is inserted into the disc-drive assembly, release pins in the assembly overcome the action of the pressing means disposed between the cartridge and the control portion of the member or members, causing the member or members to no longer press against the flange of the hub assembly. This allows the annular sealing surfaces on the hub and the cartridge to move out of contact. The hub assembly is thus permitted to contact a spindle mechanism in the disc-drive assembly, and, having been removed from all contact with the cartridge, to rotate while the cartridge remains stationary. This release of the sealing and restraining mechanism is accomplished without the use of any sort of handle disposed on the top of the cartridge and without the necessity of elastically deforming the cartridge.

Preferred embodiments of the present invention will now be described with reference to the figures. The first described embodiment is referred to as a "lever clamp" design. FIG. 1 shows a cartridge containing a magnetic disc employing this embodiment to seal the cartridge and to restrain the hub assembly and disc from moving or rotating when not in use. As seen in FIG. 1, cartridge 22 has a generally short square shape with the mechanism of the present invention located on its bottom side 34. FIG. 2 is a view of a portion of the bottom of the cartridge with part of the armature plate 56 of the hub assembly 70 cut away in order that the lever 22 and the annular sealing flange 30, as well as other components of the mechanism, may be seen.

The construction of a cartridge employing the mechanism of the first described embodiment is best understood by reference to FIG. 3, which is a sectional view taken along the lines 3—3 of FIG. 2. As seen in FIG. 3, the top 32 and the bottom 34 of the cartridge are generally parallel to each other. The magnetic disc 36, which rotates within the cartridge 22 when it is inserted into a disc-drive assembly, is mounted generally parallel to the top 32 and the bottom 34 of the cartridge 22. Disc 36 is clamped to hub 38 about a region adjacent to its inner opening and thus moves axially and rotates with the hub 38.

Hub 38 has an annular wall section 40 with an outwardly extending annular flange 42 upon whose surface the inner portion of the disc 36 adjacent to its opening is placed for clamping to the hub 38. Clamp 44 is a generally flat plate-like member pressing the inner portion of the disc adjacent to its opening against the upper surface of the outwardly extending annular flange 42. It is held in place by fastening screws 46 attaching it to the top of hub 38.

At its bottom, hub 38 has a thin inwardly extending annular portion 48 and, integral with this, a thickened partially hollow section or centering means 50 located in the region about the axis 24 of hub 38. The thickened portion or centering means 50 has a cylindrical shape on its outside, with the axis of the cylinder corresponding to the axis 24 of hub 38 and the center of the magnetic disc 36. The inside of the thickened section or centering means 50 is partially hollowed out to form a truncated cone whose axis also corresponds with the axis 24 of hub 38 and the center of the magnetic disc 36, the smaller end of the truncated cone being located toward the top.

The disc-drive assembly (not shown) has a truncated cone-shaped protrusion sized to be accommodated within the hollowed out truncated cone-shaped section of the centering means 50. Thus, a cartridge inserted into the disc-drive assembly is correctly positioned when the centering means 50 is slipped over the truncated cone-shaped protrusion in the disc-drive assembly.

Firmly attached to the bottom of hub 38 and mounted co-axially with the axis 24 of hub 38 is a flat annular plate or armature 56 oriented perpendicular to the axis 24 of the hub. Armature 56 is made of magnetic material and is fastened to hub 38 by means of fastening screws 58. When the cartridge 22 is inserted into a disc-drive assembly, armature 56 magnetically couples to a spindle in the disc-drive assembly to enable the hub 38 and disc 36 to be rotated. The opening at the center of the armature 56 permits access by the truncated cone-shaped protrusion of the disc-drive assembly to the centering means 50. It is assumed, for purposes of the described embodiments of the present invention herein, that the disc-drive assembly is of the magnetic type, i.e., the armature 56 is magnetically attracted to and couples with a corresponding rotatable magnetic plate that is part of the spindle in the disc-drive assembly. However, as will be apparent to those skilled in the art from the further description of the present invention, the present invention can be used with virtually any other method of disc-drive and any other type of centering means.

On the upper side of the armature 56 an annular stepped plate 60 is attached. Plate 60 has an annular mounting flange 62 for mounting to the upper surface of the armature 56 by fastening screws 64. Extending radially outward from the mounting flange 62 of the plate 60 and vertically separated from the armature 56 is an annular sealing flange 66. Annular sealing flange 66 has an upper annular sealing surface 68 which is generally parallel to the top 32 and the bottom 34 of the cartridge and the magnetic disc 36. Hub 38 and the above-described components which are fixedly attached thereto, including annular sealing flange 66, will hereafter at times be referred to collectively as hub assembly 70.

In its central area adjacent to the hub assembly 70, the bottom side 34 of the cartridge 22 has a flange 98 formed integrally with the bottom side 34, as can best be seen in FIG. 3. Cartridge flange 98 is much closer to the disc 36 than is the bottom side 34 in order that components of the sealing and restraining mechanism can be accommodated, as will be described. Thus, annular sealing flange 66, although above armature 56, is located below the portion of the cartridge flange 98 which it overlaps when viewed in an axial direction.

In the area beneath cartridge flange 98, levers 72 are positioned around the hub assembly 70. In the first described embodiment, three levers, spaced on a circular pattern, are used. As shown in FIGS. 2, 3 and 4, lever 72 is loosely mounted on a pivoting stud 74 which is fixedly attached to the cartridge flange 98 by a fastening screw 75. Pivoting stud 74 has a shoulder 76 which is larger in at least one dimension than is the opening 78 in lever 72, so that lever 72 may rest upon shoulder 76. A second stud 80 is also attached to the cartridge flange 98 and also projects in a downward driection. Opening 82 located in the pressing arm 84 of the lever 72 is slightly larger than the diameter of stud 80, which projects through opening 82 in order to restrict the pivoting action of lever 72 to a vertical direction; lever 72 cannot pivot in a horizontal plane.

The particular structure of lever 72 can be seen in FIG. 5. The main portion of lever 72 on either side of the opening 78 about which lever 72 pivots when in use is an essentially flat member having arcuate edges with radii of curvature corresponding approximately, to the radial distances of the respective edges of the lever 72 from the axis of the hub assembly 70 when the lever 72 is mounted on cartridge flange 98.

The control arm 86 of lever 72, i.e., that part of lever 72 which includes the portion shown to the left of the pivoting stud 74 in FIGS. 3 and 4, has a stepped portion 88 which extends at approximately a right angle from the main portion of lever 72. The stepped portion 88 has two purposes.

Since the armature 56 rotates when the cartridge 22 is inserted into a disc-drive assembly, in order to gain access to lever 72 from outside the cartridge, it is desirable that a portion of lever 72 extend beyond the edge of the armature 56. As best seen in FIGS. 1 and 2, this stepped portion 88 is located, radially with respect to the axis of the hub assembly 70, beyond the armature 56 and provides such access.

The other purpose of the stepped portion 88 of the control arm 86 of lever 72 is to provide a vertical separation between the bottom of the cartridge flange 98 and the control arm 86 of lever 72 in which a coil spring 90 for pushing on the control arm 86 from above may be disposed.

As shown in FIGS. 3 and 4, a short positioning stud 91 is mounted on the cartridge flange 98 and projects downward. A coil spring 90 is positioned over stud 91. Coil spring 90 thus presses downward on the stepped portion 88 of the control arm 86 of lever 72 and tends to rotate lever 72 counterclockwise as viewed in FIG. 3.

The pressing arm 84 of lever 72 has, located radially inward from its main portion, a small projecting contact portion 92 which overlaps, in a vertical direction, the annular sealing flange 66 on the hub assembly 70. As will be described, this portion of lever 72 is brought into contact with the annular sealing flange 66 of the hub assembly 70 in order to seal the cartridge 22 and to restrain the disc 36 and hub assembly 70 from rotating when the cartridge 22 is not in use.

The operation of the first described embodiment of the present invention can best be understood with reference to FIGS. 3 and 4, which show the first described embodiment of the present invention when the cartridge 22 is not in use, and FIGS. 6 and 7, which are views similar to FIGS. 3 and 4, but with the cartridge 22 inserted into a disc-drive assembly. When the cartridge is not in use, spring 90 exerts a downward force on the top surface of the stepped portion 88 of the control arm 86 of lever 72. This force tends to pivot lever 72 about pivoting stud 74 causing the pressing arm 84 to move upward. The upward motion of the pressing arm 84 of lever 72 is transmitted, through the radially inwardly located contacting portion 92, to the bottom surface of the annular sealing flange 66 located on the hub assembly 70. The other two levers 72, not shown in FIGS. 3 and 4, operate similarly so that the annular sealing flange 66 is axially displaced upwards. This upward axial displacement continues until the annular sealing surface 68 of the annular sealing flange 66 contacts the bottom surface 94 of the of cartridge flange 98. The friction between surface 94 on the cartridge and the annular sealing surface 68 on the hub assembly 70 prevents the disc 36 and the hub assembly 70 from rotating and also seals the cartridge from the ingress of contaminants. It will be noticed that in this position the bottom surface of the stepped portion 88 of the control arm 86 of lever 72 is approximately flush with the outer portion of the bottom 34 of cartridge 22 and with the armature 56.

When the cartridge 22 is inserted into a disc-drive assembly, surface 94 on the cartridge flange 98 must be separated from the annular sealing surface 68 on the hub assembly 70 in order that the hub assembly 70 and the disc 36 be free to rotate and to provide an opening through which clean air may be circulated from the disc-drive assembly into the cartridge 22. To accomplish this, release pins protruding upward from the bottom of the disc-drive assembly are arranged so that when the cartridge 22 is inserted into the disc-drive assembly with the centering means 50 of the cartridge 22 placed upon the truncated cone-shaped protrusion, the release pins will push upward on the stepped portions 88 of the control arms 86 of levers 72 and overcome the force of the coil springs 90. The arrows in FIGS. 6 and 7 show the location of a release pin which pushes upon the bottom surface of a stepped portion 88 of a control arm 86 and the direction of the force exerted by the release pin when the cartridge 22 is inserted into the disc-drive assembly. FIG. 7, in the area of the lever 72, is taken along a slightly different line than is FIG. 3 in order to better show the orientation of the entire lever 72 when the cartridge 22 is inserted into the disc-drive assembly. Under the influence of the release pin, lever 72 pivots upon pivoting stud 74 so that the pressing arm 84 of lever 72 moves out of contact with and away from annular sealing flange 66 as is best shown in FIG. 6.

The described motion of lever 72 allows the hub assembly 70 and the disc 36 to move vertically downward. The extend of this downward motion is governed by the arrangement of components in the disc-drive assembly which vertically position the armature 56 and the bottom 34 of the cartridge 22. However, this motion is sufficient to allow the annular sealing surface 68 on the annular sealing flange 66 of the hub assembly 70 to move out of contact with the lower surface 94 of the cartridge flange 98, so that a spacing 96 exists between the surfaces 68 and 94. Since no part of the hub assembly 70 or the disc 36 is now in contact with the cartridge 22, the disc-drive assembly may rotate the hub assembly 70 and the disc 36 while cartridge 22 remains stationary. Furthermore, clean air from the disc-drive assembly may enter the cartridge 22 through spacing 96.

Although not apparent from the figures, clean air may circulate over both the top and bottom of the disc. This is because neither hub wall 40 nor clamp 44 are continuous unbroken surfaces. At positions where fasteners, such as fastening screws 46, are not deployed, wall 40 and clamp 44 have openings or passages through which the clean air that enters the cartridge 22 through spacing 96 may reach the top of the cartridge 22 in order to insure cleanliness of both surfaces of the disc.

A second described embodiment of the present invention is shown in FIG. 8, which is a view similar to that shown in FIG. 2 with respect to the first described embodiment. Three or more levers 172 of the type shown in FIG. 8 would be used in connection with a cartridge employing this embodiment. FIG. 9, which is a sectional view taken along the lines 9—9 in FIG. 8, illustrates that the components of the hub assembly 170 of this embodiment are similar to those described with respect to the first described embodiment. Thus, disc 136 is clamped by plate 144 to hub wall 140. Hub 138 has a thin annular portion 148 surrounding the centering means 150. Armature 156 is attached by fastening screws 158 to the hub 138.

In the second described embodiment, however, the annular sealing flange 166 extends radially outward beyond the edge of the armature 156. Comparing FIGS. 2 and 8, it may be seen that in the first described embodiment shown in FIG. 2, most of the lever 72 was positioned directly above the armature 56, necessitating, in that embodiment, that the control arm 86 have a portion 88 extending radially beyond the edge of the armature 56. In the embodiment shown in FIG. 8, almost the entire lever 172 is located radially beyond the edge of the armature 156. Unlike the pressing arm 84 of lever 72 of the first described embodiment, the pressing arm 184 of the lever 172 of the second described embodiment may, when placed into a disc-drive assembly, be allowed to come into contact with the surface immediately below it, as that is a non-rotating surface that is part of the bottom 134 of the cartridge 122.

Figure 10:
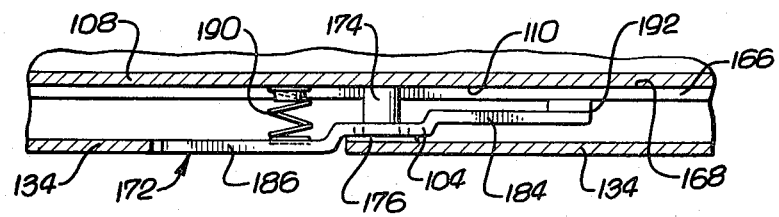
FIG. 10 is a sectional view taken along the lines 10—10 of FIG. 8, in which the mechanism of the second embodiment is shown when the cartridge is not inserted into a disc-drive assembly, the mechanism sealing the cartridge and restraining the hub and disc.

Lever 172 differs from lever 72 in several aspects of its construction, as can be seen most clearly in FIGS. 8 and 10. While lever 172, as viewed in FIG. 8, is straight as compared to lever 72, as viewed in FIG. 2, lever 172 is stepped into three sections of different heights. Pivot section 104 of lever 172 is intermediate in height with respect to the control arm 186 and the pressing arm 184. The lowest portion of lever 172 is the control arm 186, which, when the cartridge is not in use, is flush with the bottom 134 of the cartridge. The highest portion of the lever is the pressing arm 184 which has a small projecting contact surface 192 for contact with the annular flange 166 of the hub assembly 170.

When the cartridge 122 is not in use, the coil spring 190, which is disposed between the cartridge flange 108 and the control arm 186, presses the control arm 186 downward so that the lever 172, pivoting about pivoting stud 174, forces the pressing arm 184 upward, axially displacing the annular sealing flange 166 of the hub assembly 170. The annular sealing flange 166 is displaced until the annular sealing surface 168 located on it comes into contact with the downward facing surface 110 of the cartridge flange 108. The contact between these surfaces seals the cartridge 122 from the ingress of contaminants and also prevents the rotation of the hub assembly 170 and the disc 136 when the cartridge 122 is removed from a disc-drive assembly.

Apertures 112 located in the bottom 134 of the cartridge 122 is positioned to expose the control arms 186 of the levers 172, so that the control arms 186 may be acted upon by release pins in a disc-drive assembly when the cartridge 122 is inserted therein. The motion of the lever 172, however, differs in some respects from the motion of the lever 72 when pressed upon by the pins in the disc-drive assembly, as can be seen with reference to FIGS. 10, 11 and 12.

Figure 11:
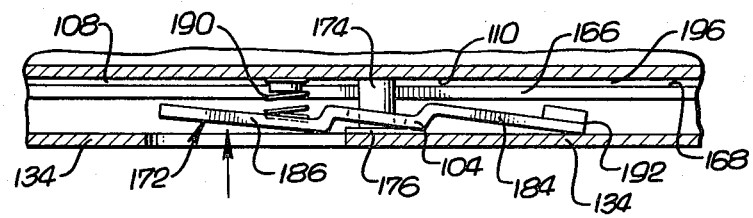
FIG. 11 is a view similar to that shown in FIG. 10 in which the mechanism of the second embodiment is shown while the cartridge is being inserted into a disc-drive assembly.
Figure 12:
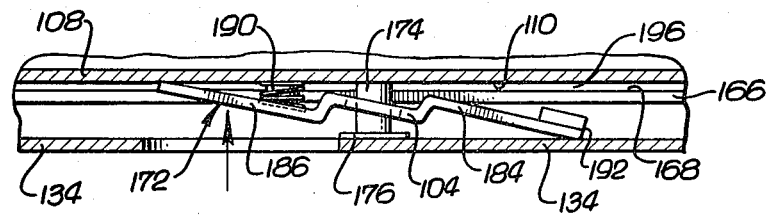
FIG. 12 is a view similar to that shown in FIG. 10, in which the mechanism of the first embodiment is shown after the cartridge has been inserted into a disc-drive assembly, the mechanism unsealing the cartridge and permitting the hub and disc to be rotated.
Figure 13:
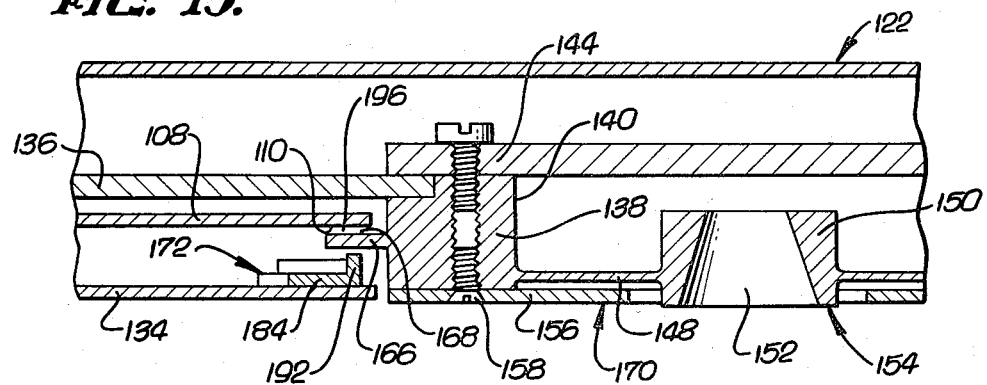
FIG. 13 is a view similar to that shown in FIG. 9, in which the mechanism of the first embodiment is shown after the cartridge has been inserted into a disc-drive assembly, the mechanism unsealing the cartridge and permitting the hub and disc to be rotated.

FIG. 10 shows the lever 172 pressing upon the annular sealing flange 166 of the hub assembly 170, as it does when the cartridge 122 is removed from a disc-drive assembly. In FIG. 11, the cartridge 122 is in the process of being inserted into a disc-drive assembly, the arrow in FIG. 11 indicating the position of a release pin in the disc-drive assembly when the cartridge is being inserted and the direction of the force exerted by the release pin on the lever 172. The force of the release pin causes the lever 172 to rotate on the pivoting stud 174 in a clockwise direction as viewed in FIG. 11. The rotation of the lever 172 continues until the end of the pressing arm 184 contacts the upper surface of the bottom 134 of the cartridge 122. With the lever 172 in this position, maximum possible separation between the contact portion 192 of the lever 172 and the annular sealing flange 168 of the hub assembly 170 exists and, as the cartridge 172 continues to be lowered onto the release pins, the end of the pressing arm 184 can no longer move downward. Since the release pin continues to press upon the control arm 184 in an upward direction against the force of spring 190, the lever 172 is lifted off of the shoulder 176 of the pivoting stud 174 and pivots about the end of the pressing arm 184, as shown in FIG. 12. This motion could continue until the end of the control arm 186 comes into contact with the cartridge flange 108 as shown in FIG. 12. In the actual implementation of the second described embodiment of the present invention, however, the length of the release pins and the interior dimensions of the cartridge 122 would be selected so that the end of the control arm 186 would never contact the cartridge flange 108 of the cartridge 122.

It will be appreciated by those skilled in the art that, in the second described embodiment of the present invention, the tolerances for the amount that the release pins may project into the cartridge 122 are increased over those for the first described embodiment. This is because, in the second described embodiment unlike in the first, the end of the pressing arm 184 is allowed to contact the surface beneath it, that surface being a non-rotating part of the cartridge 122 itself and because the lever 172 is allowed to move up off of its shoulder 176.

After the cartridge 122 has been inserted into a disc-drive assembly, the action of the hub assembly 170 and disc 36 are similar to that described with respect to the first described embodiment. Thus, the hub assembly 170 may move independently of the cartridge 122, and in fact will move downward until the armature 156 comes into contact with cooperating components of the disc-drive assembly. With the cartridge 122 in this position, air may enter into the cartridge through the spacing 196 between the surface 110 of the cartridge flange 108 and the annular sealing surface 168 of the hub assembly 170. As described with respect to the first described embodiment, vertical openings (not shown) in the hub wall 140 and the clamp 144 allow clean air entering the cartridge through the spacing 196 to circulate over the top surface of the disc 136 as well as across the bottom surface.

Figure 14:
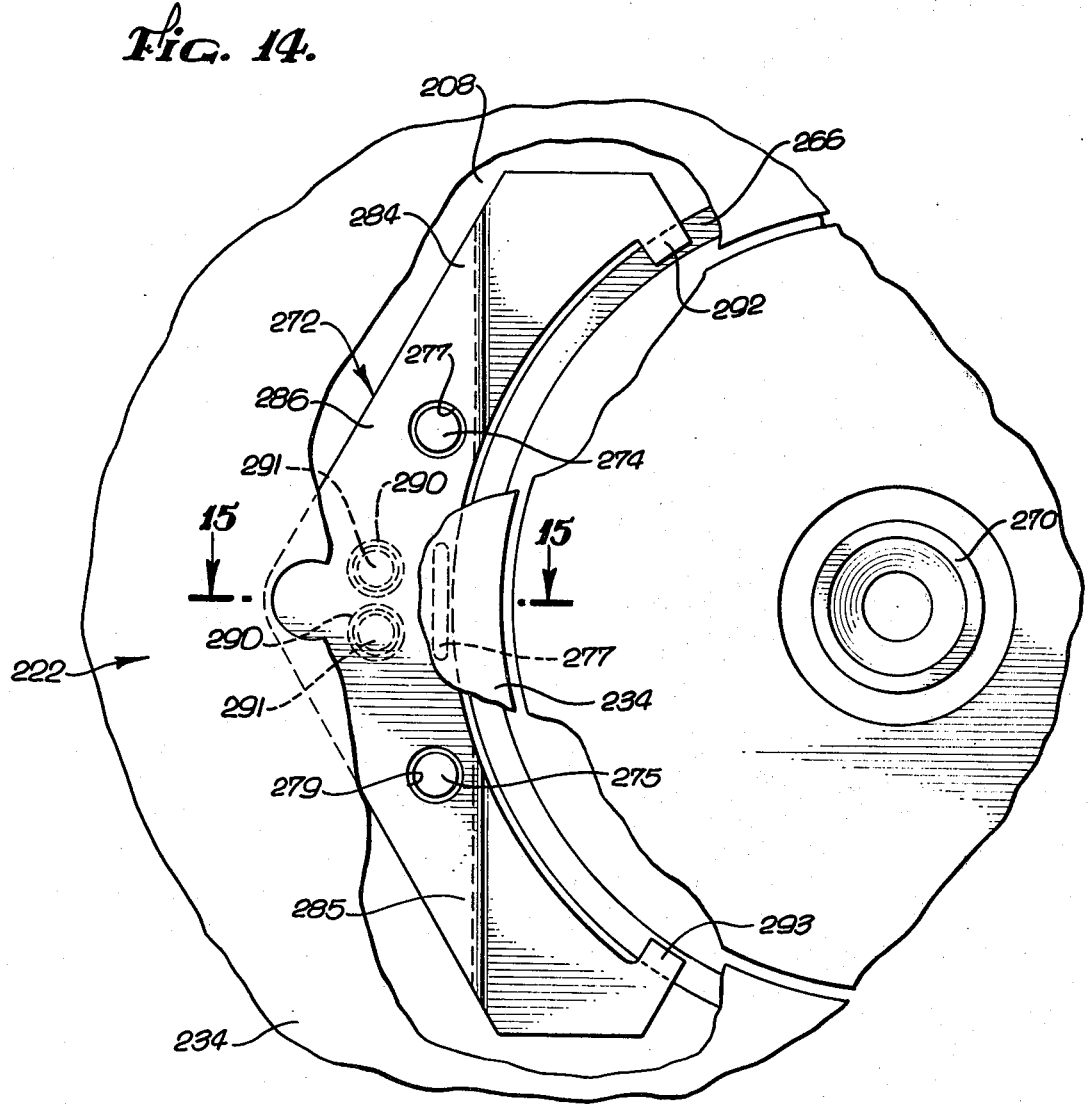
FIG. 14 is a partial cut-away view, taken from beneath, of a cartridge using the third described embodiment of the present invention.

A third described embodiment of the present invention is shown in FIG. 14, which is a partial cut-away view, taken from beneath of a cartridge using this described embodiment.

Figure 15:
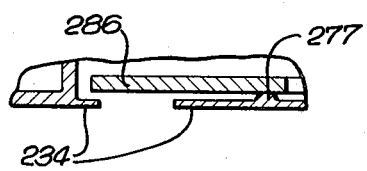
FIG. 15 is a partial sectional slice view taken along the lines 15—15 in FIG. 14.

Distinguishing this embodiment is the use of a lever 272 having two pressing arms 284 and 285 and a single control arm 286. Each of the pressing arms 284 and 285 has a projecting contact portion, 292 and 293 respectively, for pressing upon the annular sealing flange 266 at two points. Lever 272 is pivotally mounted to the cartridge 222 over upwardly extending pivoting studs 274 and 275 extending through corresponding openings 277 and 279 in lever 272. The lever 272 actually pivots upon a short, rounded, elongated protrusion 277 as seen in FIG. 15. This protrusion is located between the pivoting studs 274 and 275 and extends along the line joining the pivoting studs 274 and 275 at the surface of the bottom side 234 of the cartridge 222, as seen in FIG. 14.

Coil springs 290 and 291 are placed between the control arm 286 of lever 272 and the cartridge flange 208 in order to press upon the control arm 286. When the cartridge 222 is not inserted into a disc-drive assembly, springs 290 and 291 exert a downward force on control arm 286 of lever 272 causing it to pivot on protrusion 277. Thus, both pressing arms 284 and 285 are rotated upward so that their respective contact portions 292 and 293 are brought into contact with, and axially displace upward, the annular sealing flange 266. This axial displacement of the annular sealing flange causes the annular sealing surface located on the side of the annular sealing flange 266 opposite to that shown in FIG. 14 to be brought into contact with an annular sealing surface located on the bottom surface of the cartridge flange 208, thereby sealing the cartridge and restraining the hub assembly and disc.

When cartridge 222 is inserted into a disc-drive assembly, a release pin located in the disc-drive assembly pushes upward on the control arm 286 of lever 272 in a manner similar to that described with respect to the first and second described embodiments, overcoming the downward force exerted by springs 290 and 291 on the control arm 286. This action pivots lever 272 along protrusion 277 and causes the pressing arms 284 and 285 to move out of contact wit the annular sealing flange 266, thereby unsealing the cartridge 222 and permitting the hub assembly 270 and the magnetic disc 236 to be rotated by the spindle mechanism of the disc-drive assembly.

In the first two described embodiments, at least three levers would normally be necessary to ensure good sealing of the annular sealing flange against the sealing surface on the cartridge, and thus three release pins disposed in the disc-drive assembly would be necessary to rotate the three levers and to thereby unseal the cartridge and free the hub assembly and disc. However, in the third described embodiment, since each lever is double ended i.e., has two pressing arms 284 and 285 to press against the annular sealing flange 266 at two points, only two levers 272 are necessary in order to ensure good sealing of the sealing surfaces on the annular sealing flange and cartridge flange. Correspondingly, only two release pins disposed within the disc-drive assembly are necessary in order to rotate the levers.

In this embodiment, the pressing arms 284 and 285 of lever 272 are positioned above the bottom 234 of the cartridge 222, as was the pressing arm 184 in the second described embodiment. Because the bottom side 234 of cartridge 222 does not rotate, the pressing arms 284 and 285 may be permitted to contact this surface when the cartridge 222 is inserted into a disc-drive assembly and a release pin presses upward upon the control arm 286. Thus, as in the second described embodiment, the release pin may then lift the control arm 286 of the lever 272 so that it rides off the protrusion 277 and upwards on the pivoting studs 274 and 275, the lever 272 then pivoting on the ends of the pressing arms 284 and 285. As discussed with respect to the second described embodiment, this increases the cartridge and release pin tolerances. Thus, by the use of the mechanism of the third described embodiment, a simplified structure within the disc-drive assembly wherein only two release pins are necessary and wherein the allowable tolerances are increased is achieved.

The fourth described embodiment is referred to as a "ring clamp" design. FIG. 16 shows the bottom of a cartridge 322 containing a magnetic disc employing this embodiment to seal the cartridge and to restrain the hub assembly and disc from moving or rotating when not in use. The structure and operation of the fourth described embodiment of the present invention can be understood with reference to FIG. 17, which is a partial sectional view of the cartridge 322. As seen in FIG. 17, the top 332 and the bottom 334 of the cartridge are generally parallel to each other as in the other embodiments. The magnetic disc 336, which rotates within the cartridge 322 when it is inserted into a disc-drive assembly, is mounted generally parallel to these surfaces.

While the hub assembly 370 illustrated in FIG. 17 with respect to the fourth described embodiment differs in structural details from that described with respect to the other three embodiments, its essential features are the same as in those embodiments. Thus, disc 336 is clamped to hub 338 using the clamping plate 344. Situated above and attached to hub 338 is fan 339 which rotates with hub 338 and circulates the clean air in the area above the magnetic disc 336. A bolt 345 goes through the center of fan 339 and clamping plate 344 to attach them to the center structure of hub 338 and to firmly clamp the magnetic disc 336 in place.

The centering means illustrated in FIG. 17 with respect to the fourth described embodiment differs from that described with respect to the first three described embodiments. A flexible walled annular trough 351 is attached to the bottom of the hub 338. The flexible inner wall 353 of annular trough 351 has an inwardly extending lip 355 located on its bottom side. Because the annular wall 353 is flexible, an essentially cylindrical projection in the bottom of the disc-drive assembly having a radius equal to the radius of the inside wall 353 can be pushed into this area in order to center the hub assembly 370 onto the disc-drive assembly. It will be appreciated by those skilled in the art that many configurations of hub assemblies and centering means can be suitably used in conjunction with any embodiment of the present invention.

As in the other embodiments, a magnetic plate or armature 356 having a central opening to accommodate the centering means is attached by fastening screws 358 to the bottom of the hub 338. In this embodiment, the armature 356 extends radially outward beyond the structure of the hub 338 so that its top surface is usable as a flange, as will be described.

The annular sealing ring 366 is an essentially ring-shaped member fastened to the hub 338 in the area below the magnetic disc. This annular sealing ring 366 extends radially outward beyond the structure of the hub 338 and has an annular sealing surface 368 on its bottom side parallel to the top side 332 and bottom side 334 of cartridge 322.

Cartridge flange 308 is situated above the bottom 334 of the cartridge 322 and is generally parallel to the top 332 and the bottom 334 of the cartridge 322. It is located below and overlaps the annular sealing ring 366 and is provided with a sealing surface 310 on its upper side for sealing against the annular sealing surface 368 on the annular sealing ring 366.

In the fourth described embodiment, a clamping ring 372 is used in order to cause the annular sealing surface 368 on the annular sealing ring 366 to seal against the sealing surface 310 on the cartridge flange 308. The clamping ring 372 is located below the cartridge flange 308 and above the armature 356, overlapping on its inside or pressing portion 384, when viewed in an axial direction, the outer portion of armature 356. Extending radially outward beyond the pressing portion 384 and the edge of armature 356, clamping ring 372 has an outside or control portion 386. Control portion 386 is stepped down slightly below the level of the pressing portion 384 in order to allow space for coil springs to be disposed between the control portion 386 and the cartridge flange 308 and also so that the bottom surface of the control portion 386 is flush with the bottom side 334 of the cartridge and the armature plate 356 when the cartridge 322 is not in use.

Coil springs 390 are disposed at at least three positions around clamping ring 372 in the area between cartridge flange 308 and the control portion 386 of the clamping ring 372. The coil springs 390 push the clamping ring 372 downward so that the pressing portion 384 presses upon the outer edge of the armature 356. This causes the entire hub assembly 370 to be axially displaced downward until the annular sealing surface 386 of the annular sealing ring 366 contacts the sealing surface 310 of the cartridge flange 308. The contact between these surfaces seals the cartridge 322 and prevents the hub assembly 370 and the magnetic disc 336 from moving or rotating within the cartridge 322 when the cartridge 322 is not in use.

When cartridge 322 is inserted into a disc-drive assembly, release pins, such as have been described previously with regard to the first three described embodiments, push against the control portion 386 of the clamping ring 372 in an upward direction, as indicated by the arrow in FIG. 18. The upward force from the release pins overcomes the downward force exerted by the coil springs 390 and pushes the clamping ring 372 upward. Since the upward force exerted by the release pins is provided at various points around the entire clamping ring 372, both the control portion 386 and the pressing portion 384 move vertically upward, such as is shown in FIG. 18.

With the force of the clamping ring 372 no longer applied to armature 356, the annular sealing surface 368 may be disengaged from the sealing surface 310 located on cartridge flange 308. The spindle mechanism of the disc-drive assembly is thus situated with respect to that portion of the disc-drive assembly on which the bottom side 334 of cartridge 322 rests so that hub assembly 370 is pushed slightly upward with respect to the cartridge 322. This amount is less than the amount that clamping ring 372 is pushed upward in order that the hub assembly 370 and the magnetic disc 336 do not contact the clamping ring 372 and in order that the spacing 396 remain open to allow clean air to circulate within the cartridge 322. Openings (not shown in the figures) in the various components of the hub assembly 370 assist the clean air in circulating in the area above the magnetic disc 336 as does the fan 339.

While the present invention has been described with respect to various specific embodiments, there are, as is apparent, many other configurations and variations that are within the scope of the present invention. For example, the contact portions of the lever used in the first three embodiments may comprise, as in the first two described embodiments, a small upwardly projecting contact portion that contacts the annular sealing flange along a circumferential or radial line or face. Alternatively, the levers of those embodiments could have had no upwardly projecting contact portions and instead could have used a portion of the edge of the pressing arm to contact the annular sealing flange along a radial line. As another example, in the third described embodiment, a single spring centrally located could be used in place of the pair of springs 290 and 291. Thus, many modifications and variations not discussed herein may readily occur to those skilled in the art and consequently, it is intended that the claims be interpreted to cover such modifications and equivalents.

I claim:

1. In a cartridge containing a rotatable disc oriented generally parallel to the top and bottom of the cartridge and attached to a hub assembly, said hub assembly rotatable about an axis by a disc-drive assembly through an opening in the bottom of said cartridge and displaceable axially with respect to said cartridge, said cartridge for insertion into a disc-drive assembly, a mechanism for restraining the movement of said magnetic disc and hub assembly relative to said cartridge and for sealing said cartridge when said cartridge is not inserted into said disc-drive assembly comprising:

an annular surface on said cartridge near said opening, said annular surface fixed with respect to the top and bottom of said cartridge;

an annular flange carried by said hub assembly having an annular sealing surface generally opposite to said annular surface on said cartridge and configured to sealingly engage said annular surface on said cartridge; and means for axially pressing said annular sealing surface on said flange against said annular surface on said cartridge by pressing on an annular surface of said hub assembly, said means acting when said cartridge is not inserted into said disc-drive assembly to restrain said disc and hub assembly from rotating and to seal said cartridge about said opening, said means being located peripherally about said hub assembly near the bottom of said cartridge and outside that portion of the cartridge containing the disc.

2. A mechanism as in claim 1 wherein said annular surface on said cartridge is parallel to the top of said cartridge.

3. A mechanism as in claim 2 wherein said means for axially pressing said annular sealing surface on said flange against said annular surface on said cartridge includes:
- an annular ring having a first radially inward portion overlapping, in an axial direction on the lower side of said ring, a surface of said hub assembly, and a second radially outward portion extending radially outward beyond said overlapped surface of said hub assembly, said second portion overlapping, in an axial direction on the upper side of said ring, a surface of said cartridge; and
- spring means located between said second portion of said annular ring and the surface of said cartridge overlapped by said second portion, for forcing said first portion of said annular ring downward against said overlapped surface of said hub assembly when said cartridge is not inserted into a disc-drive assembly, so that said annular sealing surface on said flange is forced against said annular surface on said cartridge.

4. A mechanism as in claim 3 wherein said spring means comprises at least three coil springs disposed in a circular pattern between said cartridge and said second portion.

5. A mechanism as in claim 2 wherein said means for axially pressing said annular sealing surface on said flange against said annular surface on said cartridge includes:
- a plurality of levers having fulcrums mounted on a circular pattern on said cartridge, each said lever having a first arm located on a first side of said fulcrum for pressing in an axial direction against a surface on said hub assembly, and a second arm, located on the second side of said fulcrum overlapping in an axial direction on its upper side a surface of the cartridge; and
- spring means corresponding to each lever located between said cartridge and said second arm for pushing downward on said second arm and causing said first arm to push in an axial direction against a surface on said hub assembly when said cartridge is not inserted into a disc-drive assembly so that said annular sealing surface on said flange is forced against said annular surface on said cartridge, said mechanism capable of being rendered inoperable when said cartridge is inserted into a disc-drive assembly by a plurality of pins, one pin corresponding to each said lever, said pins pushing upward on the second arms of the corresponding lever to overcome the force of said spring means so that said annular sealing surface on said flange is not forced against said annular surface on said cartridge.

6. A mechanism as in claim 5 wherein said annular sealing surface on said annular flange of said hub assembly faces upward and the first arms of said levers push against the surface of said flange which is opposite to said annular sealing surface.

7. A mechanism as in claim 5 wherein said spring means are a plurality of coil springs oriented vertically, each coil spring disposed between said cartridge and a second arm of a lever.

8. A mechanism as in claim 2 wherein said means for axially pressing said annular sealing surface on said flange against said annular surface on said cartridge includes:
- at least one pivoted lever mounted on said cartridge, each said lever having on one side of its pivot at least one pressing arm for pressing up against a surface of said hub assembly, and on the other side of its pivot a control arm overlapping near its end a surface of the cartridge;
- means associated with each said lever disposed between said surface of the cartridge and said control arm overlapping said surface for pressing on said control arm and pivoting said lever to cause said at least one pressing arm to press against said surface of said hub so that said annular sealing surface on said flange is axially forced against said sealing surface on said cartridge, thereby sealing said cartridge at said opening and preventing said hub assembly and disc from rotating when said cartridge is not in use, said means being rendered inoperative when said cartridge is inserted into a disc-drive assembly by a pin in said disc-drive assembly corresponding to each said lever pressing on the surface of said control arm in a direction opposite to said means and overcoming said means.

9. A cartridge for a rotatable disc, said cartridge for insertion into a disc-drive assembly, comprising:
- an essentially planar, rigid and non-deformable first member located above said disc and forming the top of the cartridge;
- an essentially rigid and non-deformable second cartridge side located below said disc and having a central opening, said second member forming the bottom of said cartridge;
- a hub assembly disposed in said cartridge and independently rotatable and axially moveable relative to said cartridge, said hub assembly having a central portion located at said central opening, said hub assembly for holding a disc along the disc's inner periphery in said cartridge between said first and second members and for engagement at its central portion with a drive mechanism in the disc-drive assembly;
- a first annular sealing surface located on said second member near said central opening;
- a second annular sealing surface located on said hub assembly and opposite to said first annular sealing surface, said first and second annular sealing surfaces located and configured so that when they are pressed together, said central opening is sealed and said hub assembly and disc cannot rotate with respect to said cartridge; and
- means located near said central opening on said second member exterior to said cartridge for pressing said first and second annular sealing surfaces together when said cartridge is not inserted into a disc-drive assembly, said means acting on a surface of said hub assembly.

10. A cartridge as in claim 9 wherein said first annular sealing surface is parallel to said first member.

11. A cartridge as in claim 10 wherein said first annular sealing surface is below said second annular sealing surface and wherein said means comprises:
- an annular ring whose outer edge overlaps on its top side a portion of said second member and whose inner edge overlaps on its bottom side an annular flange on said hub assembly; and
- ring-pressing means disposed between said outer edge and said overlapped portion of said second member for pressing said annular ring away from said second cartridge side and against said annular flange on said hub assembly, whereby said first and second annular sealing surfaces are pressed together.

12. A cartridge as in claim 11 wherein said ring-pressing means comprises a plurality of coil springs.

13. A cartridge as in claim 10 wherein said second annular sealing surface is located below said first annular sealing surface and wherein said means comprises:

at least one lever pivotally mounted on said cartridge, said lever having on one side of its pivot at least one arm overlapping said hub assembly for pressing against a surface on the hub assembly and on the other side of its pivot a control arm overlapping, near its end, a portion of the second member; and lever-forcing means associated with each lever disposed between said control arm near its end and said overlapping portion of said second member for causing said at least one pressing arm to press said hub assembly in a downward direction when said cartridge is not inserted into a disc-drive assembly, whereby said first and second annular sealing surfaces are pressed together, said lever-forcing means capable of being rendered inoperative when said cartridge is inserted into a disc-drive assembly by a pin in said disc-drive assembly corresponding to each said control arm, said pin pushing said control arm to cause said pressing arm to no longer press said hub in a downward direction.

14. A cartridge as in claim 13 wherein said at least one lever is two levers peripherally located about said hub assembly opposite one another and wherein said at least one arm overlapping said hub assembly is two arms.

15. A cartridge as in claim 13 wherein said lever-forcing means is at least one coil spring.

16. A cartridge as in claim 10 wherein said means comprises:

a plurality of levers having pivots mounted in a circular pattern on the second member, each lever having a pressing arm overlapping a surface of said hub assembly in an axial direction for pressing on said surface in a direction tending to place said first and second annular sealing surfaces together; and pressing means associated with each lever for pressing said lever so that said first and second annular sealing surfaces are pressed together to seal and said central opening when said cartridge is not inserted into a disc-drive assembly.

17. A cartridge as in claim 16 wherein each lever has a control arm on the side of the pivot opposite to that on which the pressing arm is located, said control arm overlapping the second member, and wherein said pressing means associated with each lever comprises a spring located between said control arm and said second member, said spring forcing said lever to pivot so that said first and second annular sealing surfaces are pressed together when said cartridge is not inserted into a disc-drive assembly.

* * * * *